United States Patent [19]
Shioya

[11] Patent Number: 6,088,007
[45] Date of Patent: Jul. 11, 2000

[54] VIDEO RECEIVER WITH ACCESS BLOCKING CAPABILITY

[75] Inventor: Atsuyoshi Shioya, Gunma-ken, Japan

[73] Assignee: Kabushiki Kaisha Toshiba, Kawasaki, Japan

[21] Appl. No.: 08/888,237

[22] Filed: Jul. 3, 1997

[30] Foreign Application Priority Data

Jul. 5, 1996 [JP] Japan ..................................... 8-176337

[51] Int. Cl.$^7$ ..................................................... H04N 7/00
[52] U.S. Cl. ............................................. 345/10; 348/5.5
[58] Field of Search ............................. 380/10; 348/460, 348/5.5, 10, 734, 725, 1; 455/2, 6.5, 6.3; 395/188.01, 187.01, 86; 340/825.31, 825.32; 345/320

[56] References Cited

U.S. PATENT DOCUMENTS

| | | | |
|---|---|---|---|
| 5,168,372 | 12/1992 | Sweetser | 358/349 |
| 5,382,983 | 1/1995 | Kwoh et al. | 348/716 |
| 5,583,576 | 12/1996 | Perlman et al. | 348/460 |
| 5,757,414 | 5/1998 | Thorne | 348/1 |
| 5,758,258 | 5/1998 | Shoff et al. | 455/5.1 |
| 5,841,970 | 6/1996 | Tabuki | 395/187.01 |

FOREIGN PATENT DOCUMENTS 08018882  1/1996  Japan .

*Primary Examiner*—Nathan Flynn
*Attorney, Agent, or Firm*—Pillsbury Madison Sutro LLP

[57] ABSTRACT

A video receiver capable of blocking access to specified video programs. The video receiver includes, a counter for counting time periods of prosecuting the designation of a proper rating rank to video programs to be blocked access thereto, a storage device for storing the count of times, and a display device for displaying the count of times stored in the storage device.

4 Claims, 4 Drawing Sheets

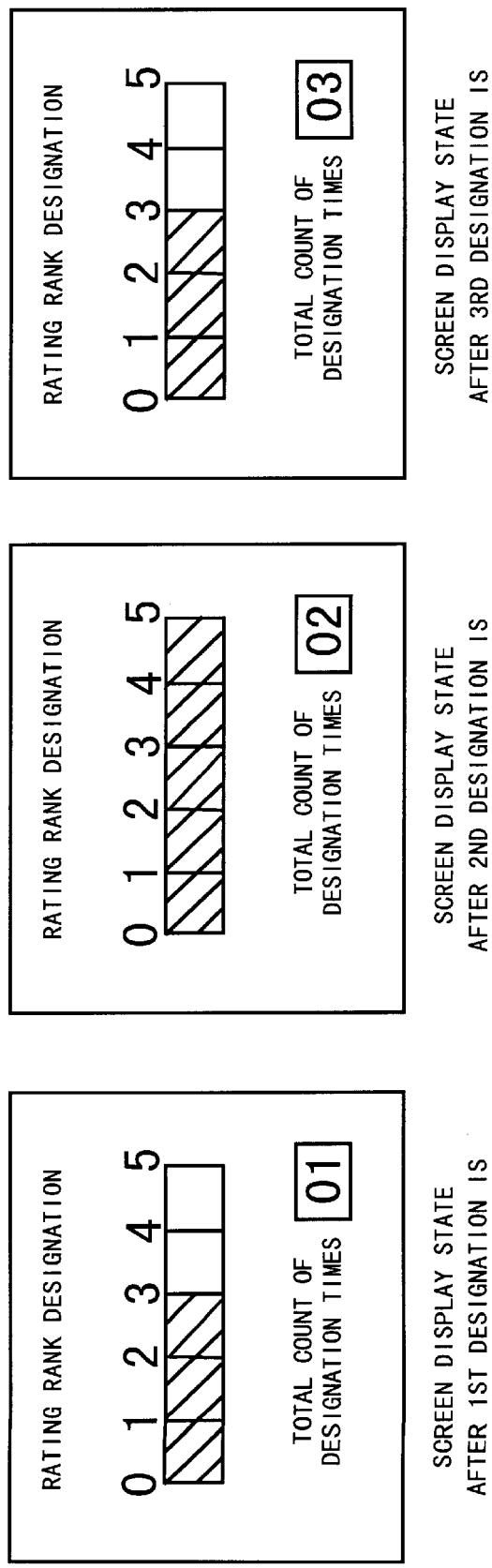

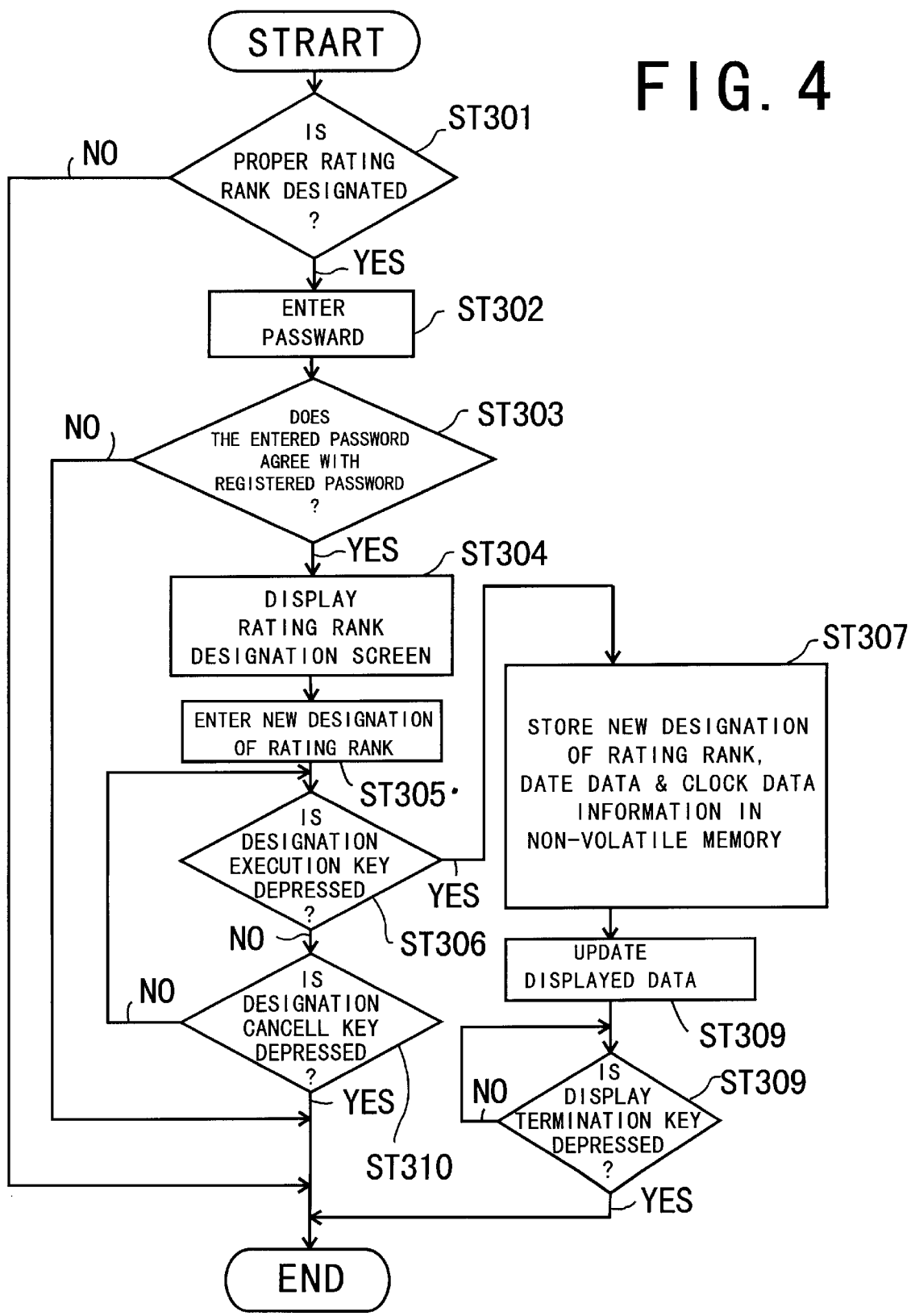

VIDEO RECEIVER WITH ACCESS BLOCKING CAPABILITY

FIELD OF THE INVENTION

The present invention generally relates to a video receiver, and more particularly, to a video receiver such as a television receiver provided with a capability of blocking access to specified video programs.

BACKGROUND OF THE INVENTION

A conventional method of blocking access to specific video programs that are prejudicial to children, such as violent and obscene video programs, utilizes a designation of specific video program channels that are barred by video receivers, such as television receivers, video tape recorders, video disc players etc., to disable the video receivers upon receiving the specific video programs. This method relies on a so-called V-chip (Violence chip) which is embedded within video receivers as mandated by the Telecommunications Act of 1996 in USA. The system operates by using a transmitter and receiver. A transmitter side transmits rating information classifying violent or obscene degrees of video program contents by superposing the rating information on video signals and a receiver side changes scenes if the rating rank of the transmitted video program exceeds the other rating rank designated by an authorized person.

Among these methods, for preventing an illegal change of rating rank designated by an unauthorized person, there is such a method in which authorized person registers a password in designating the rating rank, and thereafter the video receiver automatically rejects illegal attempts to change the designation of the rating rank without correctly entering the registered password.

However, those systems still include problems as described below.

If an unauthorized person such as a child has found the registered password, the unauthorized person may to access restricted TV programs through illegally changing the designated rating rank. Furthermore, if the original designation made by the authorized person is restored after the illegal designation change, the authorized person would be unaware that the registered password was broken and the original designation of the rating rank had been changed without authorization.

An unauthorized person who has discovered the registered password is able to freely change the designation of the rating rank or restore it until the password is updated. However, as an authorized person is not aware that that the password has been accessed and is not motivated to update it, if the password has been once found by unauthorized person, the designation of rating rank could be illegally changed while the authorized person is not aware of it.

To avoid this, a periodical updating of the password by the authorized person, increasing of password characters, a combination of various security systems such as secret commands with a password would be advantageous. These approaches, however, make it difficult and complicated to designate the rating rank by the authorized person. In addition, until the authorized person becomes aware of the illegal change of the designation, there is no motivation to resequence the password.

As described above, according to a conventional method, if the designation of a video program rating was changed by any unauthorized person, the authorized person is not able to recognize that the designation of rating was changed by any unauthorized person. That is, an authorized person is unable to recognize whether his intention for blocking access to violent or obscene video programs is being achieved or not.

SUMMARY OF THE INVENTION

It is, therefore, an object of the present invention to provide a video receiver that makes an authorized person aware of whether the designation of the rating rank for blocking access to the specified video programs has been changed by any unauthorized person.

In order to achieve the above objective, a video receiver with access blocking capability for specified video programs according to one aspect of the present invention includes, a counter for counting the time designation the ratings of video programs to be blocked, a storage device for storing the count of the designation times, and a display device for displaying the count of the designation times on the screen of the video receiver.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the advantages thereof will be readily obtained by reference to the following detailed description when considered in connection with the accompanying drawings, wherein:

FIG. 3 is a display screen of CRT of a television receiver of the present invention; and FIG. 4 is a flowchart showing another routine of prosecuting the rating rank designation by an authorized person according to the second embodiment of the present invention.

DESCRIPTION OF THE PREFERRED EMBODIMENTS

The present invention will be described in detail with reference to the attached drawings, FIGS. 1 through 4.

First the present invention is applicable when access to video programs is blocked by a V-chip. The V-chip blocks the display of pictures by comparing rating rank information that is superposed on video signals transmitted from the transmitting side with a rating rank designated by an authorized person.

Figure 1:
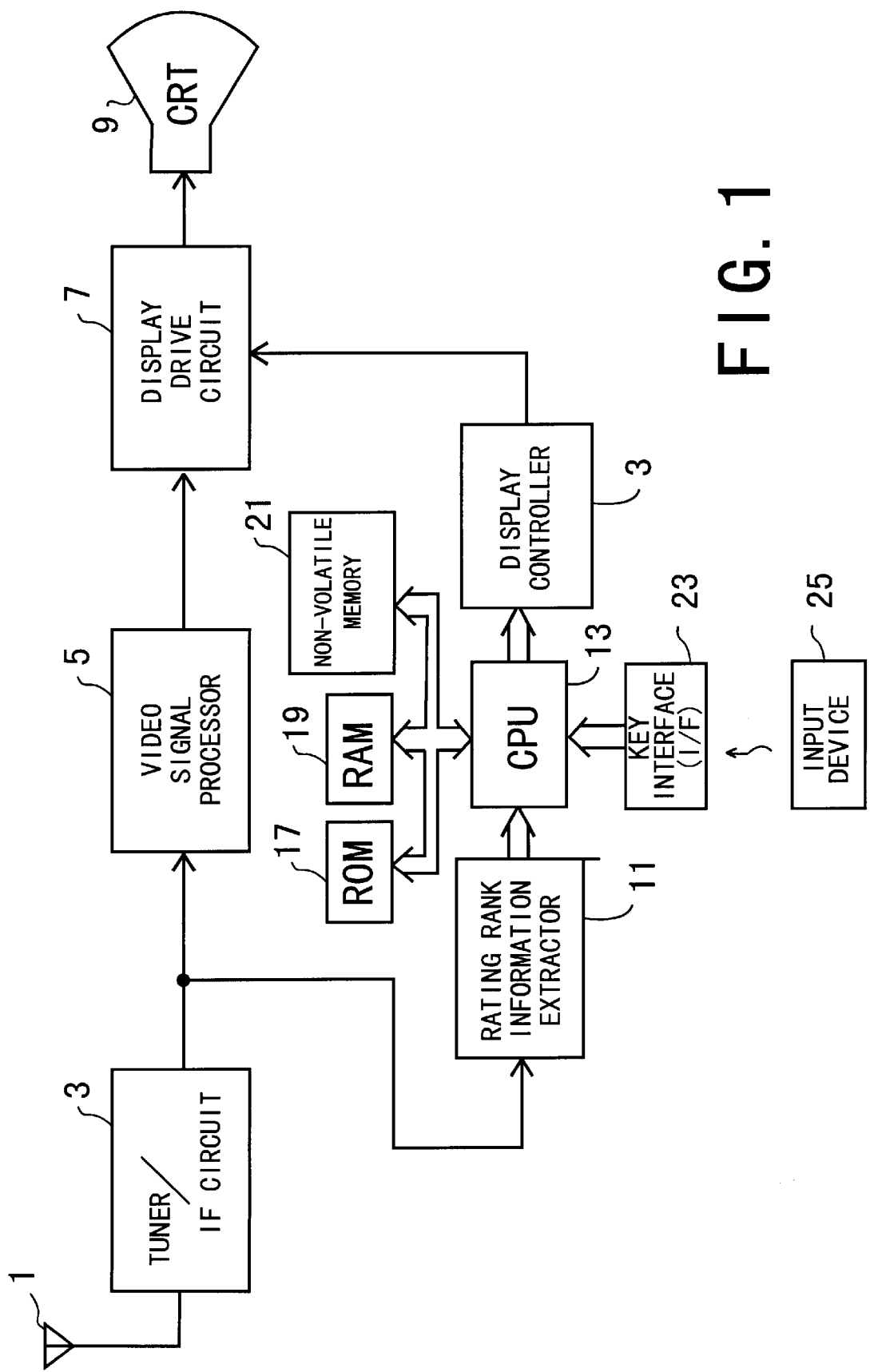
FIG. 1 is a block diagram illustrating an embodiment of the present invention.

FIG. 1 illustrates a structure of an embodiment of the video receiver, such as a television receiver. A television signal received by an antenna 1 is selected by a tuner/IF circuit 3. The IF is amplified, video-detected and supplied as a composite television signal to a television processor 5 and a rating information extractor 11.

The television signal processor 5 performs the television amplification and color demodulation of the input composite television signal and supplies a luminance signal and a chrominance signal to a display drive circuit 7.

The rating information extractor 11 extracts the rating information contained in the vertical retrace interval of the composite television signal. The extracted rating information is compared with a designation data of the rating rank which is designated by an authorized person and stored in a non-volatile memory 21 through a CPU (Central Processing Unit) 13.

If the transmitted rating rank information is higher than the designated rating rank, a blocking signal for blocking the television signal is generated by a display controller 15. The blocking signal is supplied to the display drive circuit 7 for deactivating the operation thereof. As a result, the television signal displayed on a CRT (cathode ray tube) 9 is disconnected.

In FIG. 1, numerals 17, 19, 23 and 25 denote respectively a ROM, a RAM, a key interface (I/F), and a manually input device for a controller of a microcomputer or the television receiver. The signals input through the inputted device 25 are supplied to the CPU 13 via the key interface 23. An LCD (liquid crystal display), a plasma display and the like can be used instead of the CRT 9.

Figure 2:
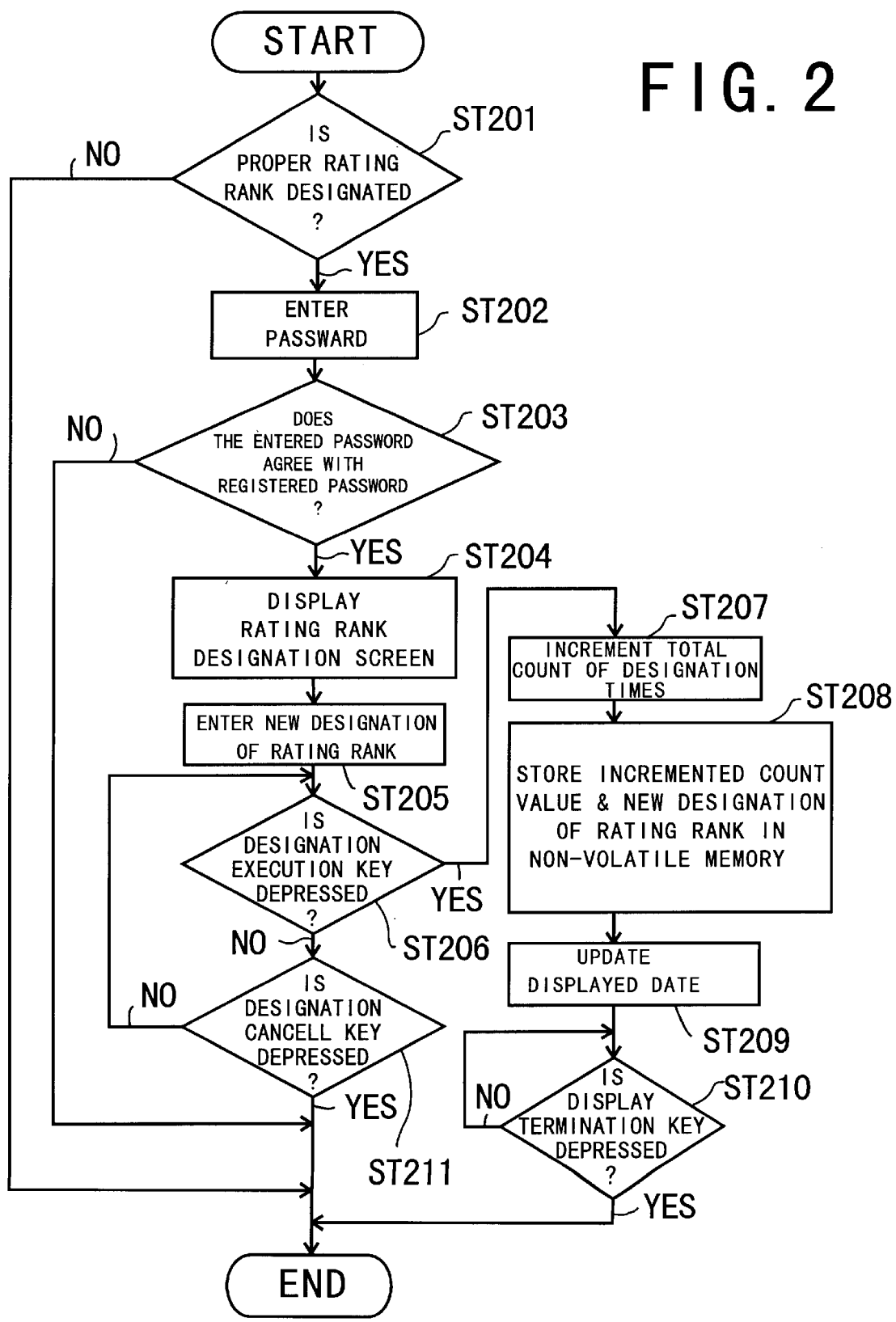
FIG. 2 is a flowchart showing a routine of prosecuting the rating rank designation by an authorized person according to the first embodiment of the present invention.

FIG. 2, illustrates a flowchart which explain a designation process of the rating rank by an authorized person. In FIG. 2, labels ST201 through ST210 show the process flow sequence. When the authorized person designates a proper rating rank through the input device 25 (when YES results in ST201), the CPU 13 displays a message requesting a password on the CRT 9 via the display controller 15 and the display drive circuit 7.

When a password is entered through the input device (ST202), the CPU 13 collates the entered password with the password which was previously registered by the authorized person in the non-volatile memory 21. If both passwords agree with each other, the rating rank designation screen is displayed. At this time, a current designated rating rank and a latest total count of the designation prosecuting times are read out from the non-volatile memory 21 and displayed on the CRT 9 via the display controller 15 and the display drive circuit 7 (ST204).

When a designated rating rank is entered through the input device (ST205) and the designation execution key of the input device 25 is depressed (when YES results in ST206), the CPU 13 increments the total count of the designation executing times stored in the non-volatile memory 21 (ST207), and stores the incremented count value together with the new designation of the rating rank in the non-volatile memory 21 (ST208). Further, the CPU 13 updates data displayed on the CRT 9 to the new designation of the rating rank and the total count of the designation times via the display controller 15 and the display drive circuit 7 (ST209).

The CPU 13 continuously displays data of the newly designated rating rank and the total count of the designation times unless the display termination key of the input device 25 is depressed (when NO results in ST210). That is, when the display termination key is depressed the display of the data is terminated (when YES results in ST210). Further, after completing the designation, the CPU 13 reads the stored rating and total count of the designation times out of the non-volatile memory 21 and displays them on the CRT 9 via the display controller 15 and the display drive circuit 7 through the key operations of the input device 25.

Further, in the above embodiment it is assumed that the password registration made by the authorized person is performed in isolation from the rating rank designation. However the password registration can be performed out simultaneously with the rating rank designation.

FIG. 3 illustrates a variety of display states on the CRT 9, i.e., a display screen showing a first designation of rating rank 3, a display screen showing a second designation of rating rank 5 and a display screen of a third designation of rating rank 3 by an authorized person. This is equivalent to a case wherein an authorized person designates the rating to rank 3 to block a television program having a rating exceeding the rank 3. Thus, it corresponds to the case where an unauthorized person changes the original designation of the rating rank 5 to other lower rank and then restores the change to the originally designated rating rank 3.

Although the designated rating rank is not changed, the total count of the designation times on the screen was changed from 01 to 03. Therefore, the authorized person is aware of that the designation of rating have been changed by an unauthorized person. So, he is able to take required actions such as making update of the password, etc.

Next, a second embodiment of a designation process of a proper rating rank by an authorized person will be explained. Storing and displaying date and time of the rating rank designation achieves the same effect as storing and displaying the total count of the designation times as shown in the first embodiment.

Date and time information can be collected by using either the calendar and clock functions incorporated in a television receiver or the date and time data superposed on the television signals. A clock device may be provided separately.

FIG. 4 illustrates a flowchart of the second embodiment of the rating rank designation process by an authorized person. In FIG. 4, labels ST301 through ST310 show the steps of the designation process. Here, only those portions differing from the first embodiment will be explained.

When an entered password agrees with a registered password and a rating rank designation screen is displayed, the CPU 13 reads out a latest designated rating rank and the date and time information at the time that the latest designation has been made. The information is then displayed on the CRT 9 via the display controller 15 and the display drive circuit 7 (ST304).

The CPU 13 restores a new designation of the rating rank and the date and clock data information into the non-volatile memory 21 upon depressing the designation key on the input device 25 (ST307). Thereafter, the new designation of the rating rank and the date and time information data are displayed on the CRT 9 (ST308).

In the second embodiment, if an authorized person remembers the date and time data of his latest designation of the rating rank, he becomes aware of that the designation of rating rank has been illegally changed by unauthorized persons through the change of the date and time data displayed on the screen. Thus, he is able to take necessary actions such as updating of the password, etc.

According to the present invention, it is possible for an authorized person to recognize whether the designation of the rating rank for blocking a specified television program was changed by any unauthorized person and specified television programs can be more surely blocked access thereto.

While there have been illustrated and described what are presently considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A video receiver capable of blocking access to specified video programs, comprising:

a counter for counting each time a designation of a proper rating rank to blocked video programs has been changed;

a storage device for storing the count of times; and a display for a device for displaying the count of times stored in the storage device.

2. A video receiver capable of blocking access to specified video programs, comprising:

an input device for inputting a designation of a proper rating rank to blocked video programs;

a clock device;

a storage device for storing clock information from the clock device that indicates a time when a change to the designation of the proper rating rank to blocked video programs is performed; and a display device for displaying the time information stored in the storage device.

3. A video receiver capable of blocking access to specified video programs, comprising:

means for counting time periods of prosecuting a designation of a proper rating rank to blocked video programs;

means for storing a count of times; and means for displaying the count of times stored in a storage device.

4. A video receiver capable of blocking access to specified video programs, comprising:

means for inputting a designation of a proper rating rank to blocked video programs;

means for storing clock information from a clock device which indicates a time when a change to the designation of the proper rating rank to blocked video programs is performed; and means for displaying time information stored in a storage device.

* * * * *